(12) United States Patent
Akama et al.

(10) Patent No.: US 6,175,545 B1
(45) Date of Patent: Jan. 16, 2001

(54) OPTICAL PICKUP APPARATUS

(75) Inventors: Yusuke Akama; Isami Kenmotsu; Tomonari Ishikawa; Osamu Yagisawa; Katsuhiko Tanimoto, all of Tokorozawa (JP)

(73) Assignee: Pioneer Electronic Corporation, Tokyo (JP)

( * ) Notice: Under 35 U.S.C. 154(b), the term of this patent shall be extended for 0 days.

(21) Appl. No.: 09/376,295

(22) Filed: Aug. 18, 1999

Related U.S. Application Data

(62) Division of application No. 08/747,666, filed on Nov. 12, 1996, now Pat. No. 5,978,347.

(30) Foreign Application Priority Data

Nov. 13, 1995 (JP) .................................................. 07-294610

(51) Int. Cl.⁷ ............................ G11B 17/30; G11B 21/02
(52) U.S. Cl. ............................................ 369/219; 369/215
(58) Field of Search ..................................... 369/215, 219, 369/220, 244, 249, 195, 199, 75.2, 75.1

(56) References Cited

U.S. PATENT DOCUMENTS

| 4,998,238 | * | 3/1991 | Mizunoe et al. | 369/116 |
| 5,105,418 | * | 4/1992 | Kenmotsu et al. | 369/195 |
| 5,157,648 | * | 10/1992 | Okamoto et al. | 369/75.2 |
| 5,235,581 | * | 8/1993 | Miyagawa et al. | 369/44.12 |
| 5,237,547 | * | 8/1993 | Ohkuma et al. | 369/13 |
| 5,263,008 | * | 11/1993 | Fujio et al. | 369/13 |
| 5,600,623 | * | 2/1997 | Miyazaki et al. | 369/219 |
| 5,978,347 | * | 11/1999 | Akama et al. | 369/219 |

FOREIGN PATENT DOCUMENTS

| 0 570 203 | * | 11/1993 | (EP) . |
| 1-78323 | * | 5/1989 | (JP) . |
| 02066731 | * | 6/1990 | (JP) . |
| 5-002757 | * | 1/1993 | (JP) . |
| 6-012682 | * | 1/1994 | (JP) . |
| 6-12682 | * | 1/1994 | (JP) . |

* cited by examiner

Primary Examiner—William Klimowicz
(74) Attorney, Agent, or Firm—Morgan, Lewis & Bockius LLP

(57) ABSTRACT

An optical disk recording and/or reproducing apparatus records and/or reproduces information on an information record surface of an optical disk loaded thereto. The optical pickup apparatus for the optical disk recording and/or reproducing apparatus is provided with: two types of optical pickups for at least two types of optical disks respectively; first and second guiding rails arranged substantially parallel to each other such that the information record surface of the loaded optical disk is disposed between the first and second guiding rails, for respectively guiding the optical pickups along the information record surface of the loaded optical disk in a radial direction of the loaded optical disk; first and second retracting rails respectively connected to the first and second guiding rails, for retracting thereonto the optical pickups from the first and second guiding rails through linkages with the first and second guiding rails respectively; a rotator frame for holding the first and second retracting rails; and a rotating mechanism for rotating the rotator frame around an axis parallel to the first and second retracting rails and for swapping the first and second retracting rails to each other.

5 Claims, 15 Drawing Sheets

OPTICAL PICKUP APPARATUS

This is a divisional of application(s) application Ser. No. 08/747,666 filed on Nov. 12, 1996, now U.S. Pat. No. 5,978,347.

BACKGROUND OF THE INVENTION

1. Field of the Invention

The present invention is related with an optical pickup apparatus used for an optical disk recording and/or reproducing apparatus, which can reproduce different types of optical disks by selectively moving two types of optical pickups on one or two moving paths.

2. Description of the Related Art

As can be seen in Japanese Utility Model Application Laying Open (KOKAI) No. Hei-1-78323, there is a compatible player which can selectively reproduce two types of record media. This compatible player is intended to selectively reproduce an optical disk and a needle type disk. The optical pickup and the needle type pickup corresponding respectively to these two types of disks are fixed and held at free edges of U-shaped brackets, respectively. In a case of reproducing the optical disk, the optical disk is scanned by removing the U-shaped bracket from a turn table, rotating it by 180 degrees around a horizontal axis and moving the optical pickup upward so as to scan the optical disk. In a case of reproducing the needle type disk, the needle type disk is scanned by again removing the U-shaped bracket from the turn table, rotating it by 180 degrees around the horizontal axis and moving the needle type pickup upward so as to scan the needle type disk.

Further, as can be seen in Japanese Patent Application Laying Open (KOKAI) No. Hei 2 66731, there is a disk reproducing apparatus which can reproduce both surfaces of a disk by moving a single optical pickup on two moving paths.

However, the reproducing apparatus in accordance with the Japanese Utility Model Application Laying Open (KOKAI) No. Hei-1-783233 is intended to reproduce a CD and a record, and the reproducing apparatus in accordance with the Japanese Patent Application Laying Open (KOKAI) No. Hei-2-66731 is intended to reproduce one type of a disk. Thus, they cannot reproduce different types os optical disks.

SUMMARY OF THE INVENTION

It is therefore an object of the present invention to provide an optical pickup apparatus used for an optical disk recording and/or reproducing apparatus, which can reproduce different types of optical disks.

The above object of the present invention can be achieved by a first optical pickup apparatus for an optical disk recording and/or reproducing apparatus, which records and/or reproduces information on an information record surface of an optical disk loaded thereto. The first optical pickup apparatus is provided with: two types of optical pickups for at least two types of optical disks respectively; first and second guiding rails arranged substantially parallel to each other such that the information record surface of the loaded optical disk is disposed between the first and second guiding rails, for respectively guiding the optical pickups along the information record surface of the loaded optical disk in a radial direction of the loaded optical disk; first and second retracting rails respectively connected to the first and second guiding rails, for retracting thereonto the optical pickups from the first and second guiding rails through linkages with the first and second guiding rails respectively; a rotator frame for holding the first and second retracting rails; and a rotating mechanism for rotating the rotator frame around an axis parallel to the first and second retracting rails and for swapping the first and second retracting rails to each other.

According to the first optical pickup apparatus, the optical pickups are respectively guided by the first and second guiding rails along the information record surface of the loaded optical disk in a radial direction of the loaded optical disk. The optical pickups are retracted onto the first and second retracting rails from the first and second guiding rails through the linkages respectively. The rotator frame holding the first and second retracting rails is rotated by the rotating mechanism around an axis parallel to the first and second retracting rails, and the first and second retracting rails are swapped to each other by the rotating mechanism. After that, by moving back the optical pickups from the swapped retracting rails through the linkages onto the guiding rails, one of the two types of optical pickups, which corresponds to the type of the loaded optical disk, can be guided by desirable one of the first and second guiding rails, so that different types of optical disks can be recorded and or reproduced by use of this corresponding one of the optical pickups in the first optical pickup apparatus.

In one aspect of the first optical pickup apparatus, both of the optical pickups are commonly guided by at least one of the first and second guiding rails.

According to this aspect, a centering adjustment for said at least one of the first and second guiding rails can be completed by a centering adjustment with respect to just one of the two optical pickups. For example, once the centering adjustment of the guiding rail for the optical pickup of three beam type is completed, it is not necessary any more to perform the centering adjustment of the guiding rail for the optical pickup of one beam type. Accordingly, the centering adjustment operation process can be simplified and there is needed only one centering adjustment mechanism, so that the number of constitutional elements of the optical pickup apparatus, and the number of processes for assembling the optical pickup apparatus can be diminished.

In another aspect of the first optical pickup apparatus, the rotating mechanism rotates the rotor frame after the optical pickups are retracted from the guide rails to the first and second retracting rails as home positions for the optical pickups.

According to this aspect, since the optical pickups are already retracted on the first and second retracting rails when the rotating mechanism rotates the rotor frame, it is possible to protect flexible cables etc. of the optical pickups from being twisted or distorted, and the damage or rupture thereof.

In another aspect of the first optical pickup apparatus, the first and second retracting rails are arranged such that the optical pickups respectively on the first and second retracting rails are opposed to each other with the axis as a center point.

According to this aspect, every time the rotating mechanism rotates the rotator frame for swapping the first and second retracting rails, the direction of the optical pickups on one of the first and second retracting rails after rotation can be speedily made appropriate for the first and second guiding rails.

In another aspect of the first optical pickup apparatus, one of the optical pickups is guided by one of the first and second guiding rails to move along the information record surface of the loaded optical disk so as to record and/or reproduce the information while the other of the optical pickups is guided to be positioned away from the loaded optical disk in standby.

According to this aspect, it is possible to prevent one of the optical pickups from contacting the loaded optical disk when the other of the optical pickups is guided along the information record surface so as to record and/or reproduce the loaded optical disk. Thus, the scratch of the loaded optical disk due to the unused optical pickup can be prevented, and the loading and unloading of the optical disk can be speedily performed.

The above object of the present invention can be achieved by a second optical pickup apparatus for an optical disk recording and/or reproducing apparatus, which records and/ or reproduces information on an information record surface of an optical disk loaded thereto. The second optical pickup apparatus is provided with: a first optical pickup for a first optical disk of one type; a second optical pickup for a second optical disk of another type, the first optical disk having the information record surface inwardly wider than the second optical disk; and a first guiding rail arranged substantially parallel to the information record surface of the loaded optical disk, for guiding the optical pickups along the information record surface of the loaded optical disk in a radial direction thereof, such that the first optical pickup is positioned on the first guiding rail at an inner side of the loaded optical disk with respect to the second optical pickup on the first guiding rail.

According to the second optical pickup apparatus of the present, since the first and second optical pickups are guided by a single guiding rail i.e. the first guiding rail along the information record surface, the number of constitutional elements of the optical pickup apparatus, and the number of processes for assembling the optical pickup apparatus can be diminished. Thus, the height of the optical pickup apparatus as well as the optical disk reproducing apparatus can be decreased and the miniaturization of the apparatus can be promoted. And that, since the first optical pickup for the first optical disk, which has the information record surface inwardly wider than the second optical disk, is positioned at the inner side with respect to the second optical pickup, the first optical pickup can move toward the inner end of the information record surface of the first optical disk without being disturbed by the second optical pickup. Further, when exchanging one of the first and second optical pickups to the other in correspondence with the exchange of the optical disks, it is not necessary to exchange the optical pickups by a rotating mechanism as in the case of the aforementioned first optical pickup apparatus.

In one aspect of the second optical pickup apparatus, the first optical pickup is guided to be positioned inwardly away from the information record surface of the loaded optical disk in standby when the second optical pickup is guided along the information record surface to record and/or reproduce the information thereof, and the second optical pickup is guided to be positioned outwardly away from the information record surface of the loaded optical disk in standby when the first optical pickup is guided along the information record surface to record and/or reproduce the information thereof.

According to this aspect, since the first or second optical pickup, which is not used for the recording and/or reproducing operation, is in standby at the position away from the information record surface, it is possible to prevent one of the first and second optical pickups, which is not used for the recording and/or reproducing operation, from interfering the other and also contacting the rotated optical disk.

In another aspect of the second optical pickup apparatus, the second optical pickup apparatus is further provided with a U-shaped retracting rail connected to the first guiding rail at one free end thereof, for retracting thereonto at least the second optical pickup from the first guiding rail through a linkage with the first guiding rail.

According to this aspect, at least second optical pickup can be retracted while the first optical pickup is guided by the first guiding rail, so that it is possible to prevent the second optical pickup from interfering the first optical pickup and also contacting the rotated optical disk.

In another aspect of the second optical pickup apparatus, the second optical pickup apparatus is further provided with a second guiding rail, connected to the U-shaped retracting rail at the other free end thereof and arranged substantially parallel to the information record surface of the loaded optical disk at an opposite side of the first guiding rail, for guiding at least the second optical pickup, which is transported through the U-shaped retracting rail, along the information record surface of the loaded optical disk in a radial direction thereof.

According to this aspect, at least second optical pickup can be retracted and transported from the first guiding rail through the U-shaped guiding rail to the second guiding rail, so that the second optical pickup can be moved onto the second guiding rail and can be guided along the information record surface at the opposite side of the first guiding rail. Thus, the optical disk of both-side-record type can be recorded and/or reproduced by use of the second optical pickup apparatus. Further, for recording and/or reproducing the optical disk of both-side-record type, a rotating mechanism as in the case of the aforementioned first optical pickup apparatus is not necessary to transport the optical pickup from the first guiding rail to the second guiding rail.

As described above, an optical pickup apparatus, which can reproduce different types of optical disks, can be realized by the present invention.

The nature, utility, and further features of this invention will be more clearly apparent from the following detailed description with respect to preferred embodiments of the invention when read in conjunction with the accompanying drawings briefly described below.

DETAILED DESCRIPTION OF EMBODIMENTS

Embodiments of the present invention are explained with reference to the drawings.

Figure 1:
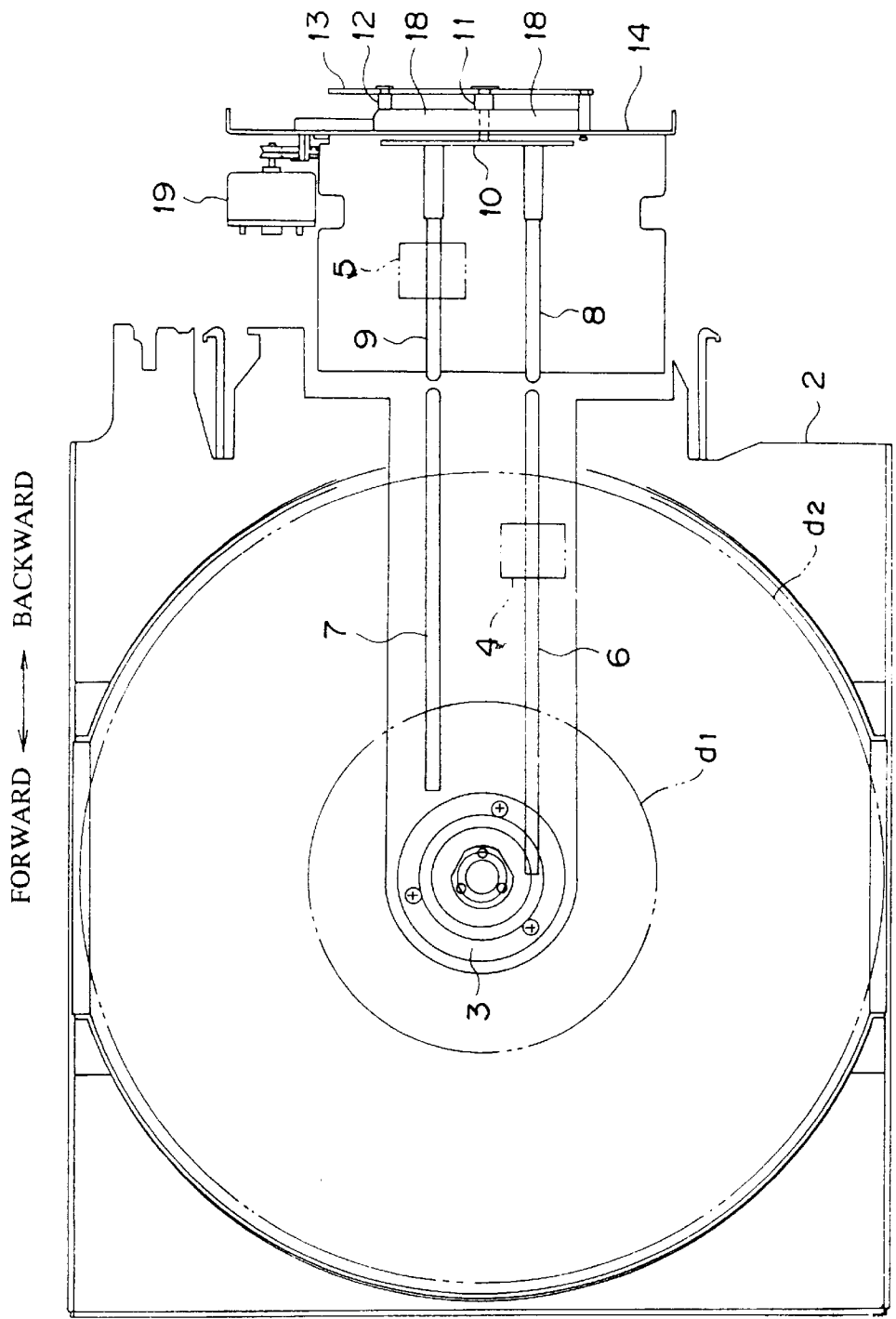
FIG. 1 is a partially broken top view showing a main portion of a disk reproducing apparatus as one embodiment of the present invention.
Figure 2:
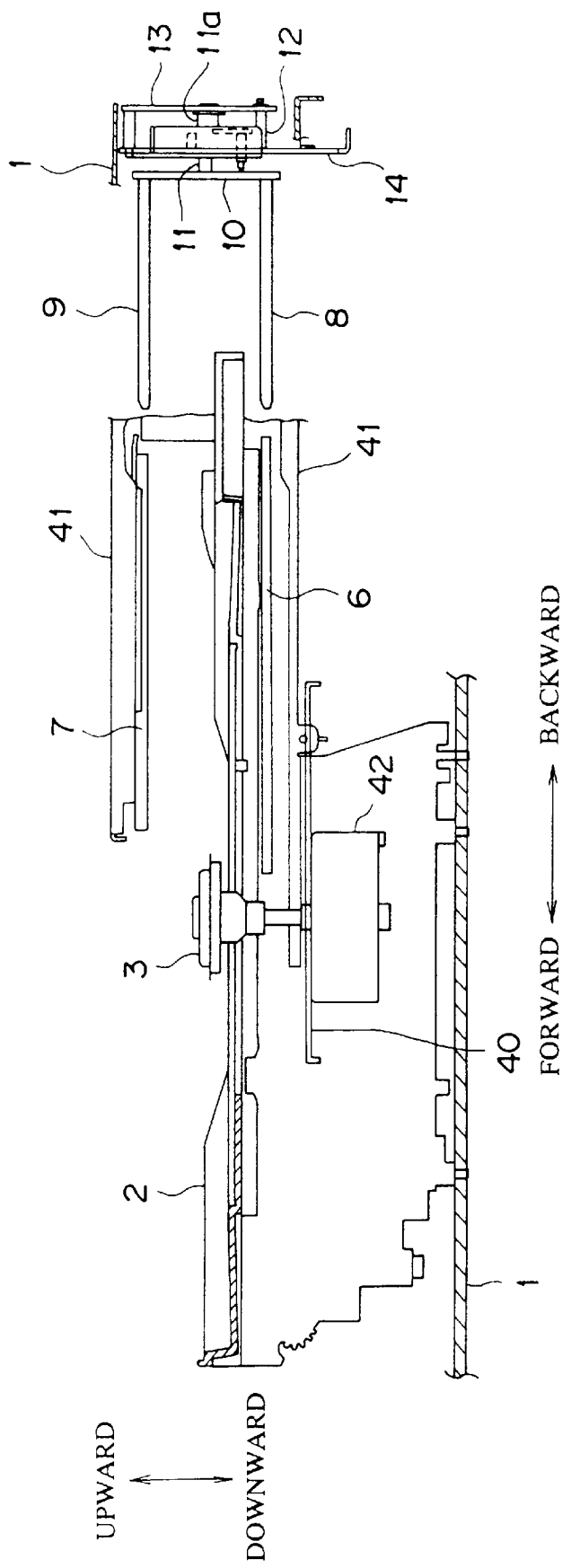
FIG. 2 is a partially broken side view when seeing the main portion shown in FIG. 1 from one side.
Figure 3:
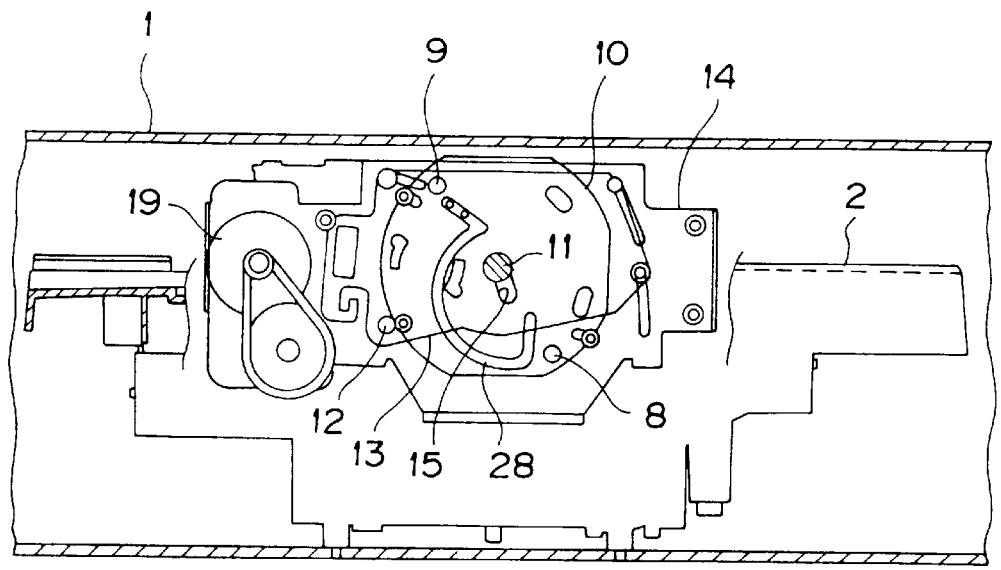
FIG. 3 is a partially broken side view when seeing the main portion shown in FIG. 1 from a front.

A disk reproducing apparatus as one embodiment of the present invention has the configuration shown in FIGS. 1 to 3, and is provided with a main body 1 assembled in a form of a box and a disk tray 2 for mounting a disk d1 or d2, which is a record medium, within the body 1. The disk tray 2 can be horizontally reciprocated in a front and rear direction (i.e. forward and backward) of the disk reproducing apparatus. Further, a turn table 3 for rotating the disk d1 or d2 is disposed at a predetermined position. Since well known parts are utilized as the disk tray 2, the turn table 3, a driving device thereof and the like, detailed explanations thereof are omitted.

The disk tray 2 is adapted so as to selectively mount one of plural types of disks d1 and d2 such as a CD (Compact Disk), a DVD (Digital Video Disk), anLD (Laser Disk) and the like. The plural types of optical pickups 4 and 5 are prepared in correspondence with the various disks d1 and d2 as described later, and adapted so as to scan the disk d1 or d2 on the disk tray 2 while moving within the disk reproducing apparatus.

In order to select one of the optical pickups 4 and 5 on the basis of the type of the disk and to select a scanning path of the pickup so as to scan either one of the front and rear surfaces of the disk d1 or d2 to be reproduced, as shown in FIGS. 1 to 15, this disk reproducing apparatus is provided with: first and second moving paths 6 and 7 for respectively guiding the two types of the optical pickups 4 and 5 which put the surface of the disk between them and are arranged substantially parallel to each other; first and second retracting paths 8 and 9 connected respectively to the first and second moving paths 6 and 7; a rotator frame 10 for holding the first and second retracting paths 8 and 9; a swinger frame 13 which holds the rotator frame 10 through a first spindle 11 parallel to the first and second retracting paths 8 and 9 and is supported by a fixture panel 14 through a second spindle 12 parallel to the first spindle 11; a swinging mechanism for swinging the swinger frame 13 with the second spindle 12 as a fulcrum; and a rotating mechanism for rotating the rotator frame 10 while the swinger frame 13 is swung to one side by the drive of the swinging mechanism and for switching the linkage between the first and second retracting paths 8 and 9 and the first and second moving paths 6 and 7.

In this disk reproducing apparatus, it is possible to omit the second spindle 12, the swinger frame 13 and the swinging mechanism, and also possible to rotate the rotator frame 10 at a constant position on the fixture panel 14 with the first spindle 11 as a fulcrum.

As shown in FIG. 2. a motor base 40 for fixing a driving motor 42 of the turn table 3 is substantially horizontally arranged within the body 1 which is a main frame of this disk reproducing apparatus. A tilt base 41 is mounted on the motor base 40. The motor base 40 is adapted so as to. be raised and lowered within the body 1 by an ascending and descending mechanism (not shown). The disk d1 or d2 on the disk tray 2 is received by the turn table 3 in conjunction with this ascending and descending action.

As shown in FIG. 2, the first and second moving paths 6 and 7 are horizontally fixed on the tilt base 41 at different levels such that the disks d1 and d2 on the disk tray 2 are disposed between the first and second moving paths 6 and 7 from upper and lower sides. Actually, each of the first and second moving paths 6 and 7 is a rail made of a round bar.

The positions of the first and second moving paths 6 and 7 can be changed in directions orthogonal to the moving paths 6 and 7, by holding the tilt base 41 on the motor base 40 through a centering mechanism (not shown). That is, the tilt base 41 is pulled on one side by a spring in a direction orthogonal to the moving paths 6 and 7 on the motor base 40. And, an adjusting cam is supported pivotably with a shaft on the tilt base 41, and the adjusting cam is in contact with the body 1 so as to resist the tensile force of the spring. Accordingly, it is possible to turn the adjusting cam to slightly move the tilt base 41 with respect to the motor base 40 to thereby carry out the centering adjustments of the optical pickups 4 and 5 on the first and second moving paths 6 and 7. In this case, for example, assuming that one optical pickup 4 is a one beam type for reproducing the OD, the DVD and the like and that the other optical pickup 5 is a three beam type for reprocucing the LD and the like it is enough to carry out the centering adjustment for the three-beam type of the optical pickup 5. The one-beam type does not require the centering adjustment, such that it is enough to move the optical pickup 4 of one-beam type on the first and second moving paths 6 and 7 with respect to the centering adjustment is carried out for the three-beam type.

The two types of the optical pickups 4 and 5 are movably installed on the first and second moving paths 6 and 7 through carriages (not shown). Optical signals inputted to and outputted from the optical pickups 4 and 5 are transmitted through flexible cables (not shown). These flexible cables extend from the respective optical pickups 4 and 5 toward the rear side of this disk reproducing apparatus and leads to terminals on the rotator frame 10.

Figure 5:
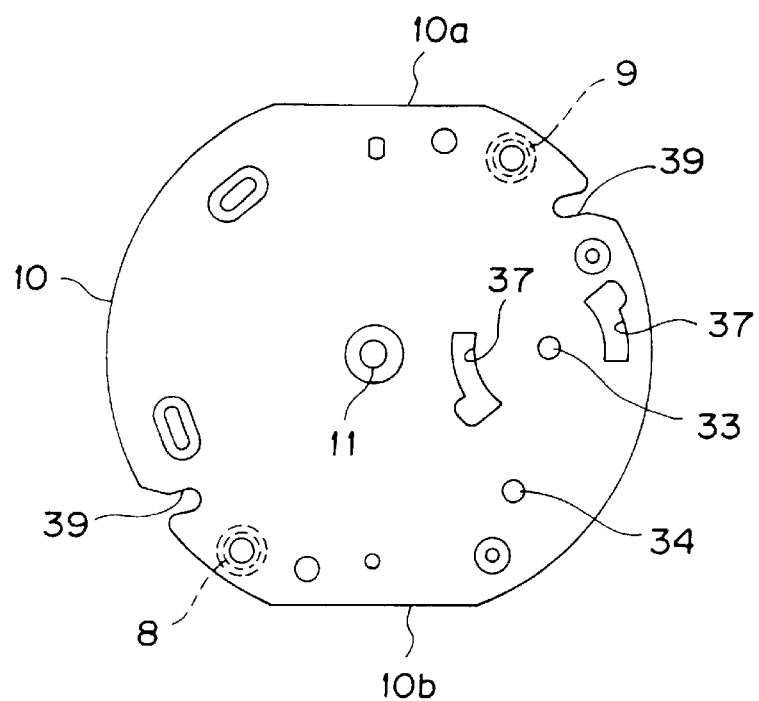
FIG. 5 is a back view of a rotator frame of the embodiment.
Figure 6:
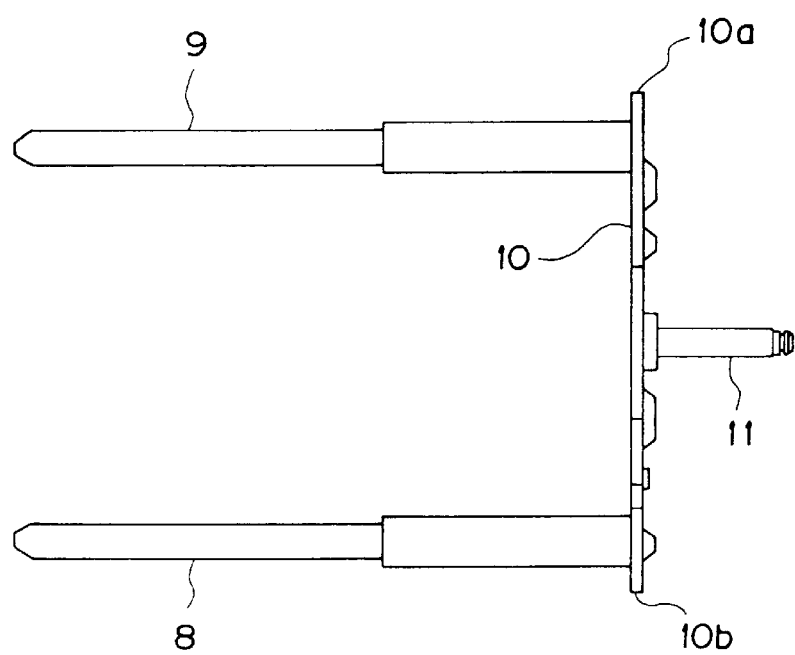
FIG. 6 is a top view of the rotator frame of the embodiment.

The first and second retracting paths 8 and 9 have the configurations similar to those of the first and second moving paths 6 and 7 and are fixed and held on the rotator frame 10 at rear edges thereof, as shown in FIGS. 5 and 6. The rotator frame 10 isacircular plate. Top and bottom ends thereof are cut away in order to reduce a height dimension of the disk reproducing apparatus. The first and second retracting paths 9, 8 are fixedat the vicinities of respective cut portions 10a, 10b thereof. The first spindle 11 protrudes from a center of the rotator frame 10 to the side opposite to the retracting paths 9, 8. The first and second retracting paths 8 and 9 are arranged opposite to each otherwith the firstspindle 11 as a center. For this reason, in a case that the rotator frame 10 is rotated by every 180 degrees around the first spindle 11, the two retracting paths 8 and 9 are accurately linked to the two moving paths 6 and 7.

As shown in FIGS. 1 to 3, the fixture panel 14 fixed on the tilt base 41 is disposed at the rear side of the rotator frame 10. The swinger frame 13 is disposed at the rear side of the fixture panel 14. The rotating mechanism and the swinging mechanism are provided between the rotator frame 10, the fixture panel 14 and the swinger frame 13.

Figure 10:
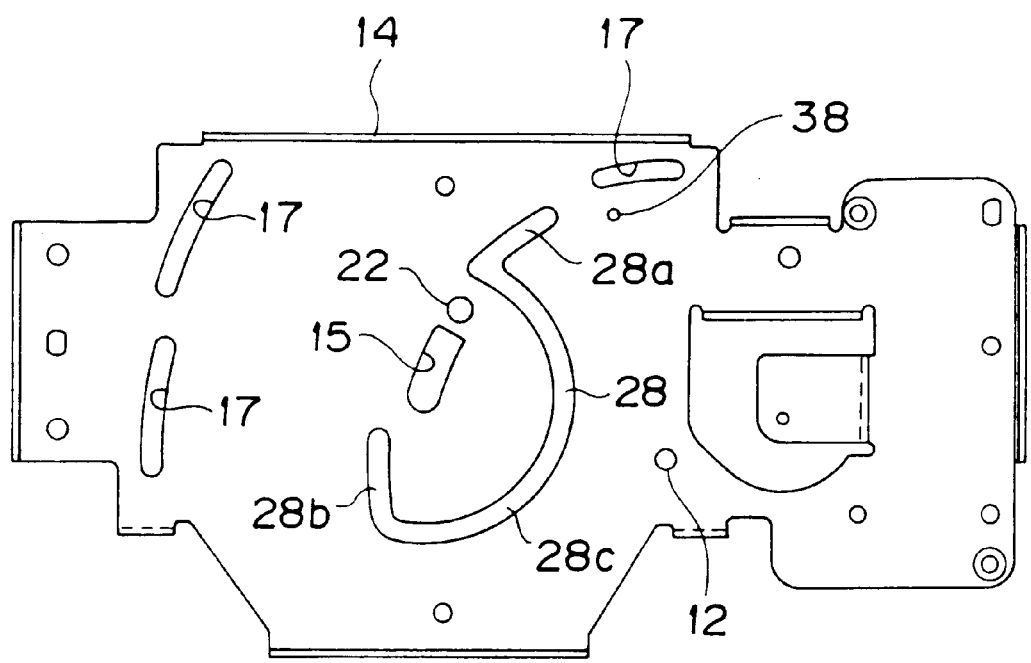
FIG. 10 is a back view of a fixture panel of the embodiment.
Figure 11:
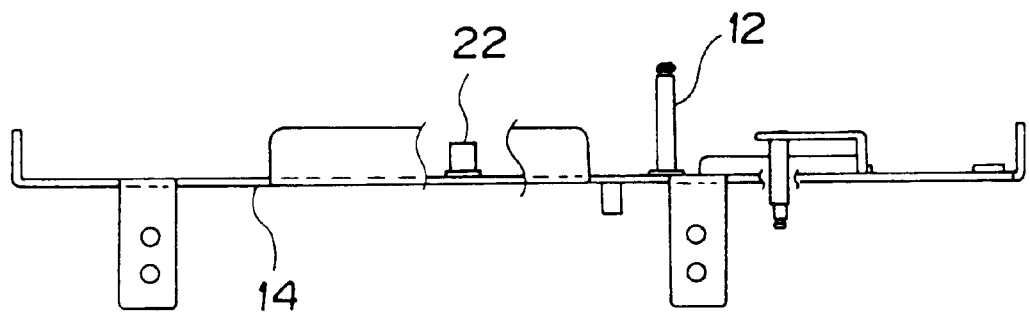
FIG. 11 is a bottom view of the fixture panel of the embodiment.

That is, as shown in FIGS. 1 to 3, the first spindle 11 extending from the rotator frame 10 penetrates through a central portion of the fixture panel 14 toward the rear side. A guide groove 15 in a form of an arch as shown in FIGS. 10 and 11 is disposed at the central portion of the fixture panel 14. The first spindle 11 penetrates through the guide groove 15. A curvature center of the guide groove 15 is the second spindle 12. The first spindle 11 penetrating through the guide groove 15 is rotatably linked and supported on the swinger frame 13 through a bearing 11a. This enables the first and second retracting paths 8 and 9 and the rotator frame 10 to be rotatably held on the swinger frame 13 within a vertical plane.

Figure 13:
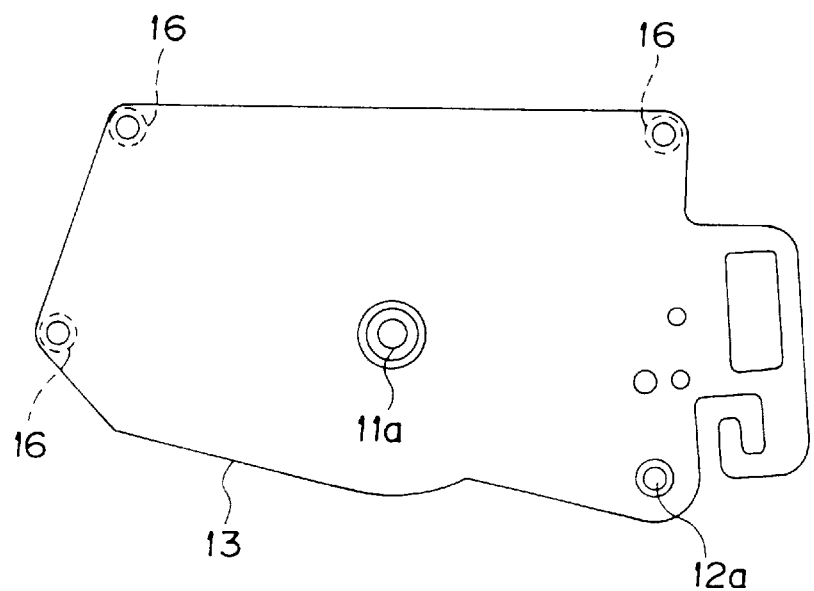
FIG. 13 is a back view of a swinger frame of the embodiment.
Figure 14:
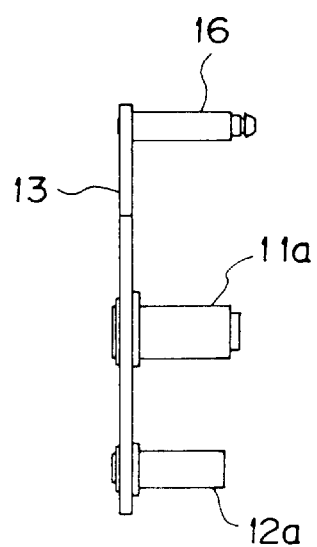
FIG. 14 is a right side view of the swinger frame.

As shown in FIGS. 1 to 3, the swinger frame 13 is supported on the fixture panel 14 through the second spindle 12, in a condition swingable upward or downward. The second spindle 12 is disposed at a position separated from the rotator frame 10 on the fixture panel 14. As shown in FIGS. 13 and 14, the swinger frame 13 is a plate in a form of a substantial rectangle, and a bearing 12a into which the second spindle 12 is inserted is disposed on the swinger frame 13, and a plurality of guide pins 16 are disposed at side edge portions opposite to the bearing 12a. These guide pins 16 are slidably engaged within other guide grooves 17 of the fixture panel 14 shown in FIG. 10. The curvature centers of these other guide grooves 17 are also the second spindles 12. This enables the first and second retracting paths 8 and 9 and the rotator frame 10 to be swung within a vertical plane along the fixture panel 14 while they are held on the swinger frame 13.

Figure 4:
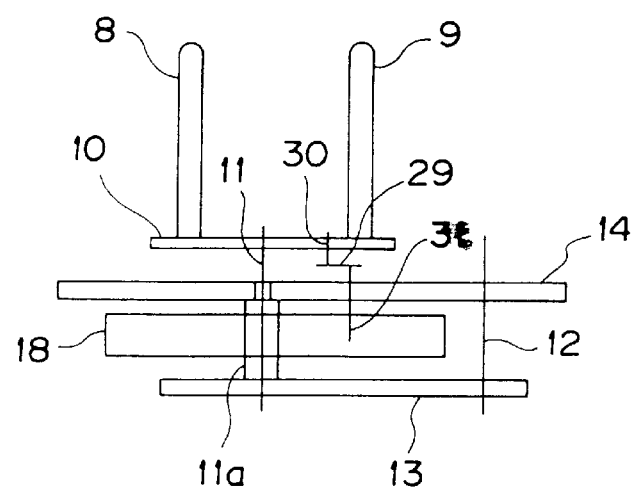
FIG. 4 is a top view showing a swinging mechanism and a rotating mechanism of the embodiment, schematically.

The swinging mechanism has a groove cam 18, as shown in FIG. 4, in addition to the second spindles 12, and has a motor 19 as shown in FIGS. 1 and 3. The groove cam 18 is rotatably supported around the bearing 11a supporting the first spindle 11. As shown in FIG. 12 and FIGS. 15 to 25, a first cam groove 20 in an endless form is formed on a front of the groove cam 18. A gear 21 is formed as a gear around an outer circumference of the groove cam 18. In FIGS. 15 to 25, various cam grooves are all represented by solid lines as a matter of convenience when drawing figures.

Figure 25:
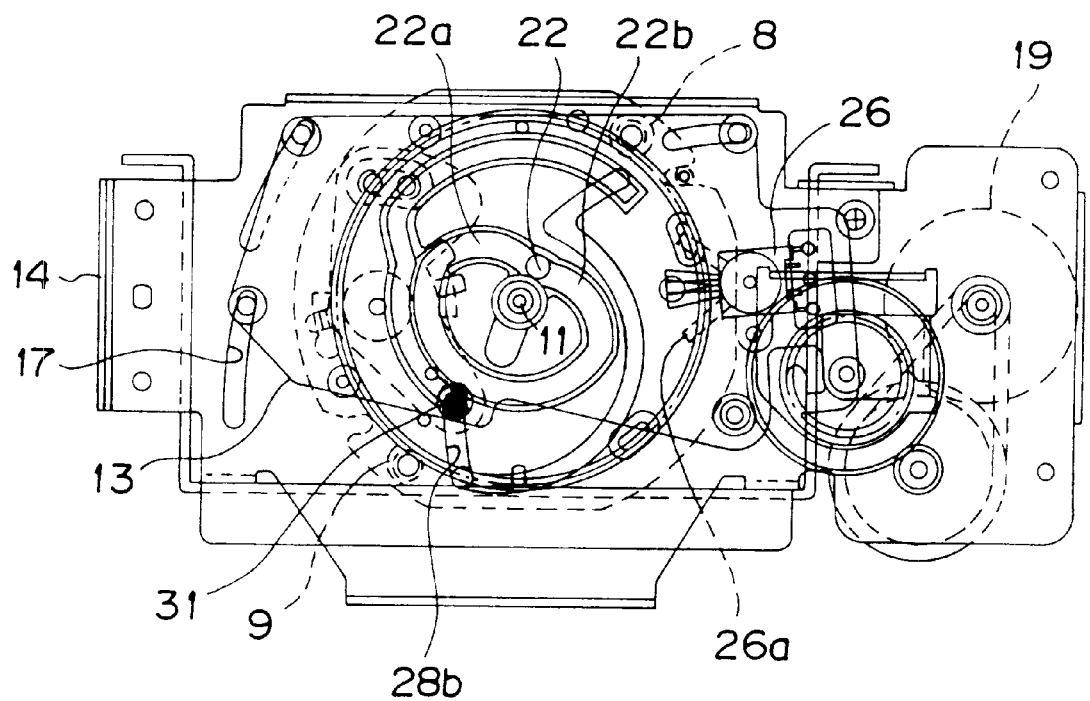
FIG. 25 is an explanation view showing a state when the swinger frame is returned to the top dead center.

FIGS. 15 to 25 are back views of the swinger frame and the rotator frame in such consecutive states that the swinger frame is located at a top dead center (FIG. 15), the swinger frame is swung downward (FIG. 16), the swinger frame is passed to a bottom dead center (FIG. 17), the rotator frame starts to be rotated (FIG. 18), the rotator frame is going to end the rotation (FIG. 19), the rotator frame has ended the rotation (FIG. 20), the swinger frame begins to be swung upward from the bottom dead center (FIG. 21), the swinger frame is swung upward (FIG. 22). the swinger frame is going to end the swinging (FIG. 23), the swinger frame nearly ends the swinging (FIG. 24) and the swinger frame is returned to the top dead center (FIG. 25). Hereinbelow, each state and operation of the swinger frame and the rotator frame will be explained in detail.

Figure 15:
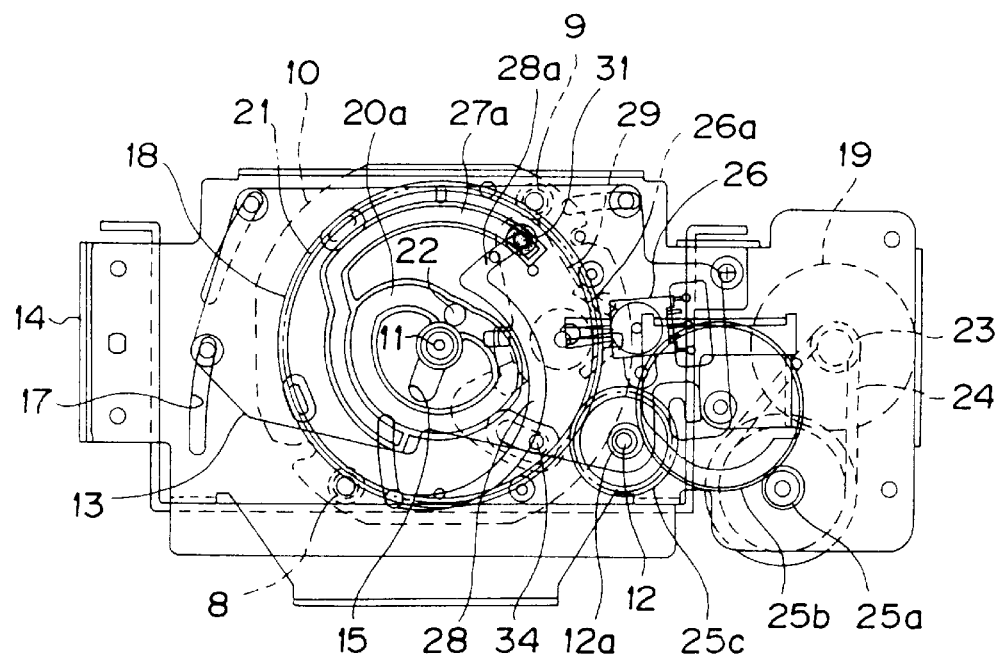
FIG. 15 is an explanation view showing a state when seeing operations of the swinger frame and the rotator frame from a back side and shows a case when the swinger frame is located at a top dead center.
Figure 16:
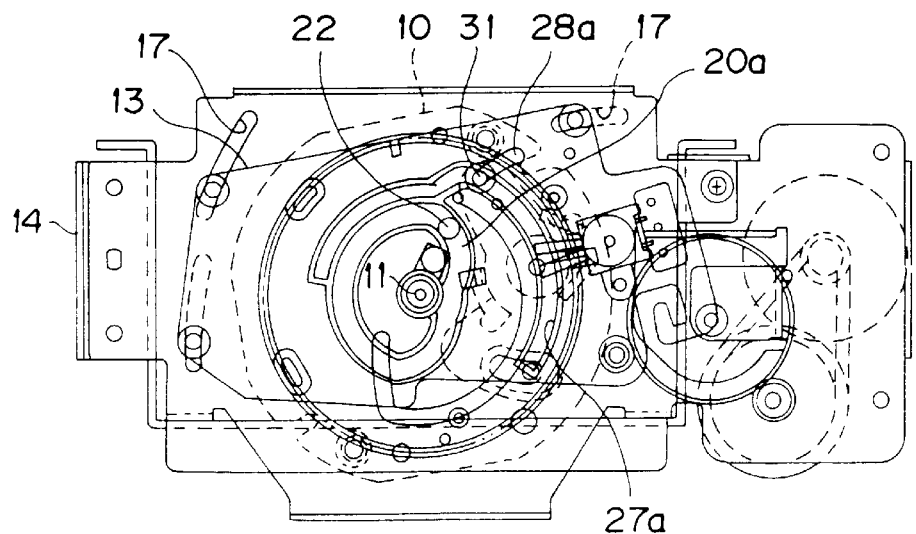
FIG. 16 is an explanation view showing a state when the swinger frame is swung downward.

A protrusion 22 protruded at the vicinity of the guide groove 15 on the fixture panel 14 as shown in FIGS. 10 and 11 is engaged with the first cam groove 20. As shown in FIG. 12 and FIGS. 15 to 25, the first cam groove 20 is constituted by a combination of two curved portions 20a and 20b for swinging the swinger frame 13 upward and downward and an arch portion 20c with the first spindle 11 as a center for keeping, for a constant time period, a state in which the swinger frame 13 is swung downward. The motor 19 is fixed on the fixture panel 14. As shown in FIG. 15, the motor 19 is adapted to transmit a rotational motion to the groove cam 18 through a belt transmission device composed of a pulley 23 and an endless belt 24 and a gear transmission device composed of rows of various gears 25a, 25b and 25c. The motor 19 can be rotated in both normal and reverse directions. A switch 26 for carrying out this switching action is attached to the swinger frame 13. A protrusion 35 for operating a switching lever 26a of the switch 26 is attached to the groove cam 18.

Figure 17:
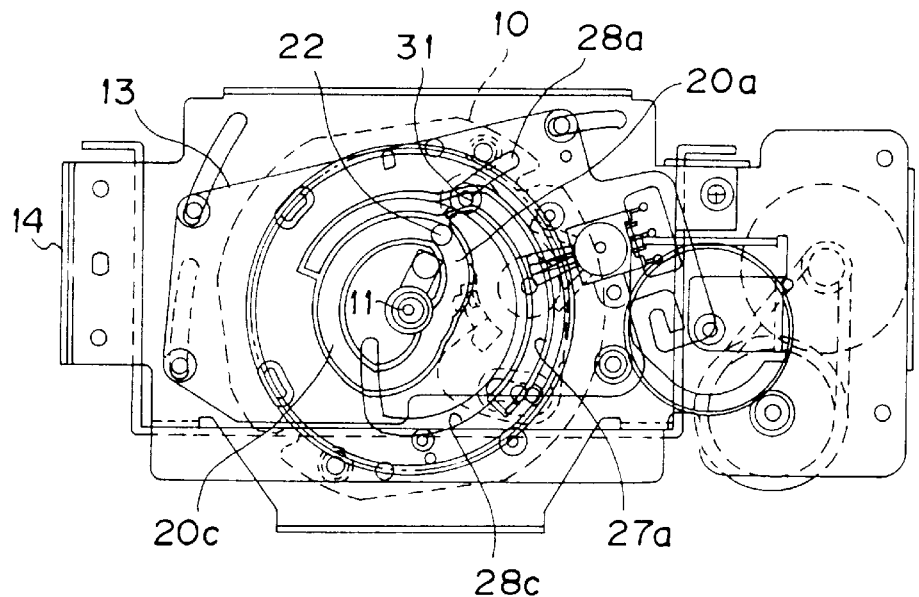
FIG. 17 is an explanation view showing a state when the swinger frame is passed to a bottom dead center.
Figure 18:
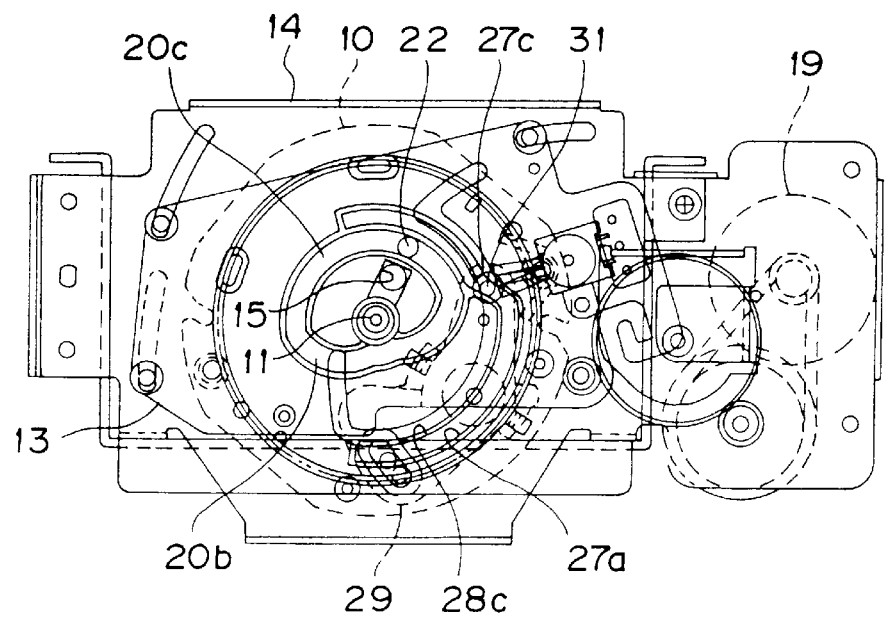
FIG. 18 is an explanation view showing a state when the rotator frame starts to be rotated.
Figure 19:
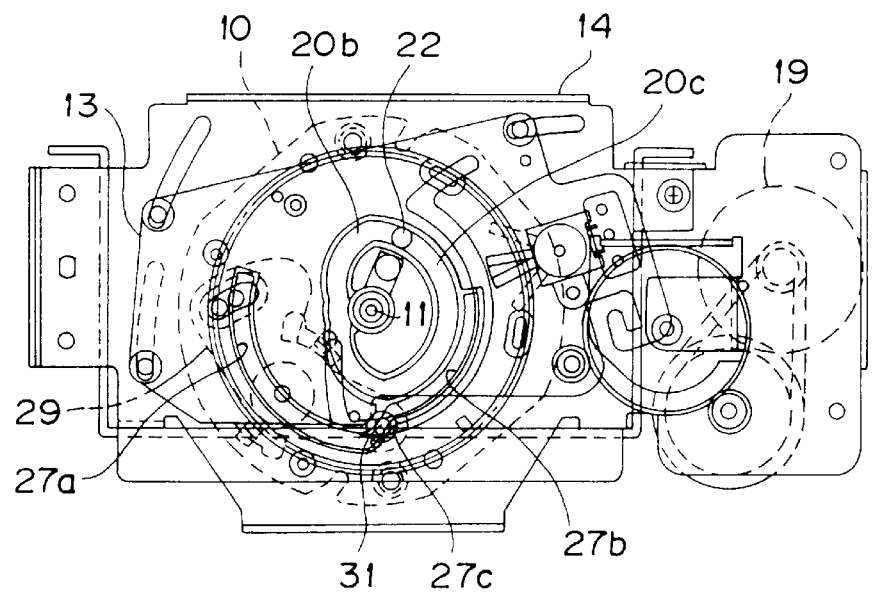
FIG. 19 is an explanation view showing a state when the rotator frame is going to end the rotation.
Figure 20:
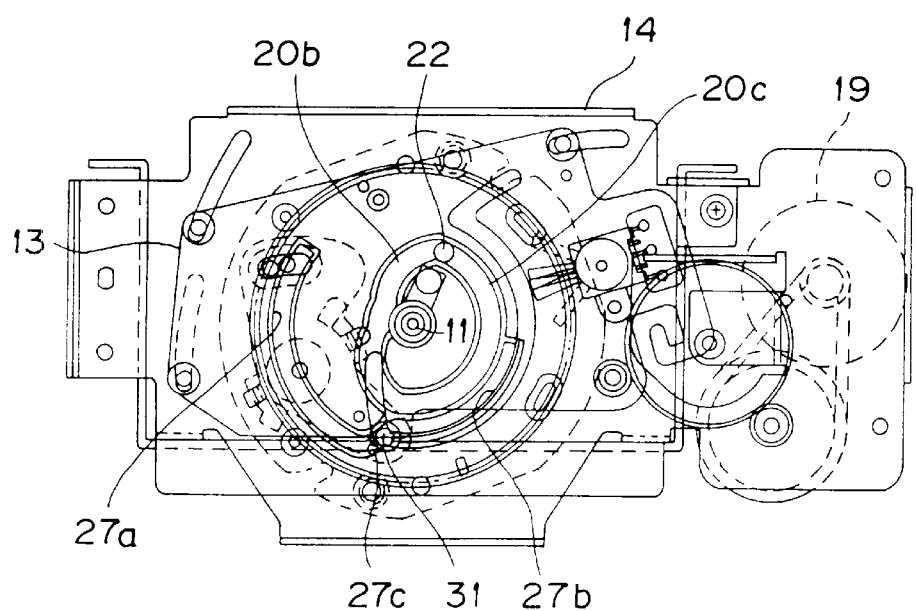
FIG. 20 is an explanation view showing a state when the rotator frame has ended the rotation.
Figure 21:
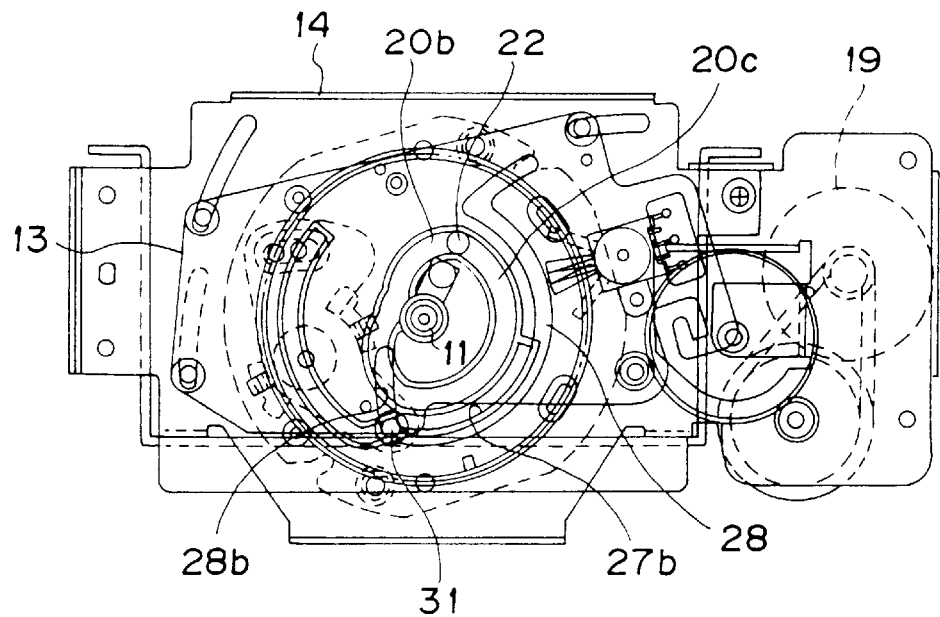
FIG. 21 is an explanation view showing a state when the swinger frame begins to be swung upward from the bottom dead center.
Figure 22:
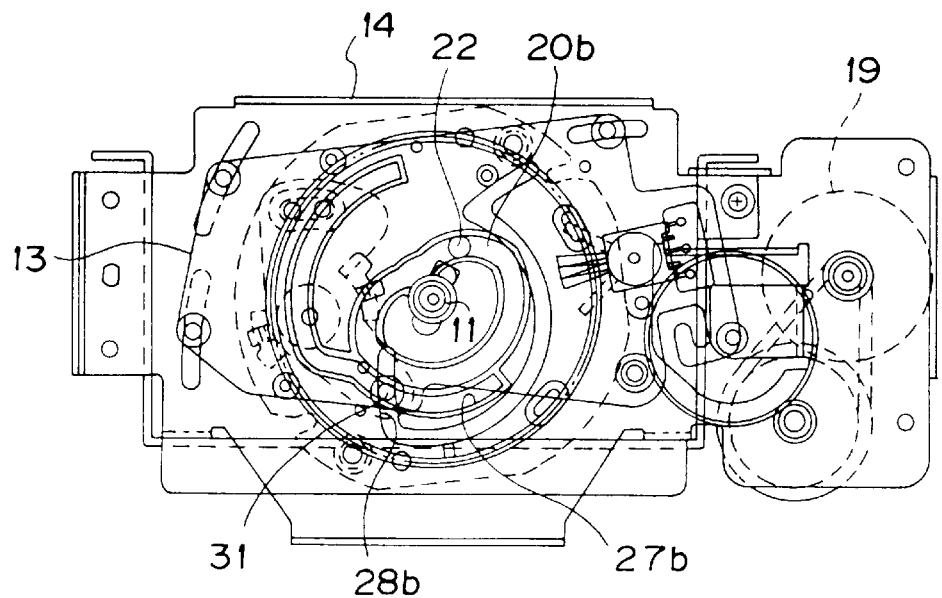
FIG. 22 is an explanation view showing a state when the swinger frame is swung upward.
Figure 23:
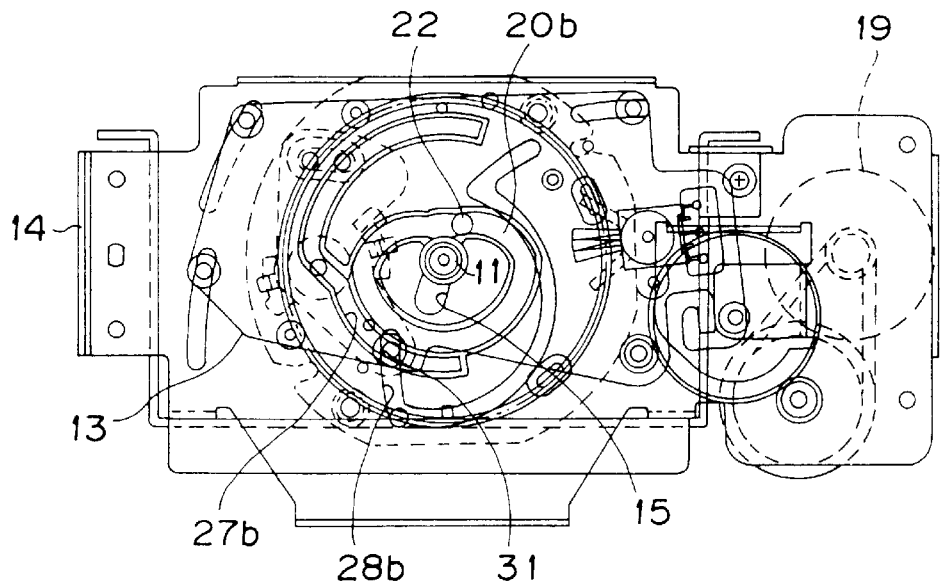
FIG. 23 is an explanation view showing a state when the swinger frame is going to end the swinging.
Figure 24:
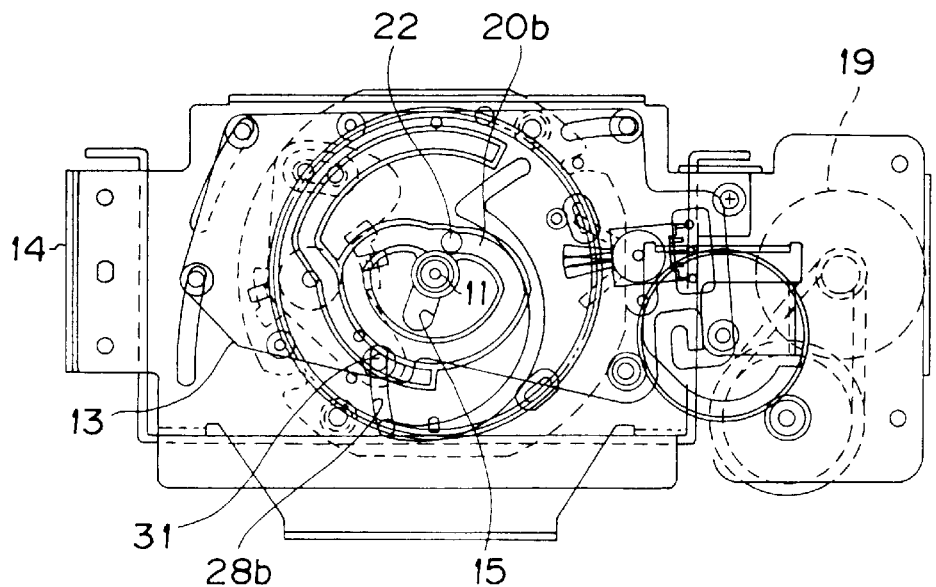
FIG. 24 is an explanation view showing a state immediately before the swinger frame ends the swinging.

Accordingly, when the motor 19 is driven in a state shown in FIG. 15 and the groove cam 18 starts to be clockwise rotated at a constant angle speed, the swinger frame 13 is swung downward, with the second spindle 12 as a fulcrum, by a relative movement between one curved portion 20a of the cam groove 20 and the protrusion 22 (FIG. 16), and is passed to a bottom dead center thereof (FIG. 17). When, at the bottom dead center, the protrusion 22 is passed into the arch portion 20c of the first cam groove 20, the swinger frame 13 maintains the downward swung state (FIGS. 18, 19, 20 and 21). After that, when the protrusion 22 is passed into the other curved portion 20b, the swinger frame 13 is swung upward with the second spindle 12 as a fulcrum (FIGS. 22, 23 and 24), and then passed to a top dead center thereof (FIG. 25).

The rotating mechanism is moved in conjunction with the swinging mechanism. In addition to the first spindle 11, the rotating mechanism is provided with a second cam groove 27 formed on the groove cam 18 as shown in FIG. 12, a third cam groove 28 formed on the fixture panel 14 as shown in FIG. 10 and a turn lever 29 which penetrates through the third cam groove 28 and is bridged between the rotator frame 10 and the second cam groove 27 as shown in FIG. 4.

Figure 7:
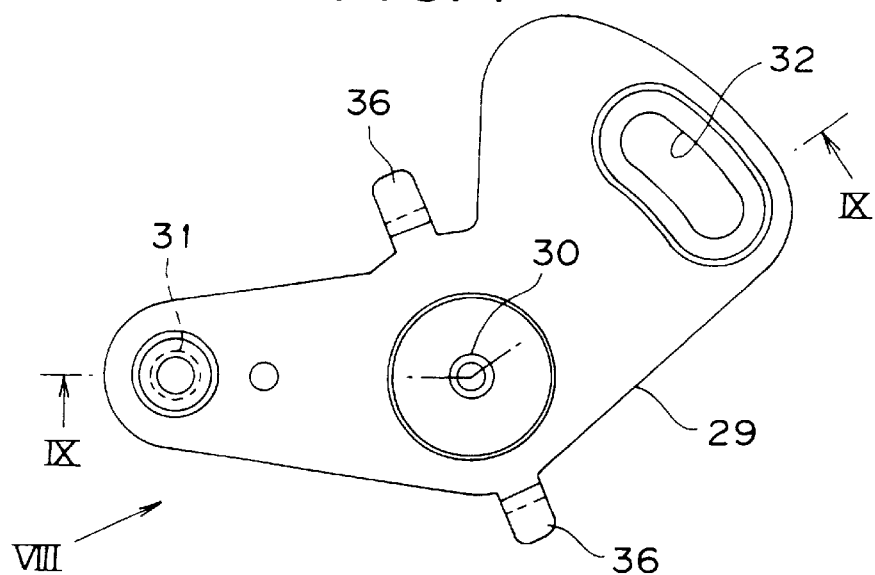
FIG. 7 is a front view of a turn lever of the embodiment.
Figure 8:
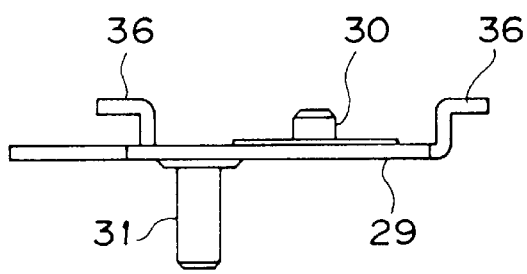
FIG. 8 is a VIII arrow view in FIG. 7.
Figure 9:
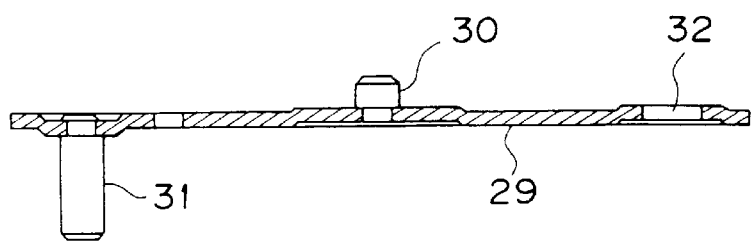
FIG. 9 is a section view taken on a line IX—IX in FIG. 7.

As shown in FIGS. 7 to 9, the turn lever 29 has a lever body in a form of a plate. A fulcrum pin 30 is disposed to stand at a central portion of the turn lever 29. A fitting pin 31 is disposed to stand at one edge, on a side opposite to the fulcrum pin 30. An arch hole 32 is opened at the other edge with the fulcrum pin 30 as a central point. And, the fulcrum pin 30 is pivotably supported in a bearing hole 33 (refer to FIG. 5) of the rotator frame 10. The fitting pin 31 penetrates through the third cam groove 28 of the fixture panel 14 and is engaged with the second cam groove 27. A guide pin 34, which is disposed to stand on the rotator frame 10 as shown in FIG. 5, is inserted into the arch hole 32. Further, as shown in FIGS. 7 and 8, one pair of claw pieces 36 are disposed in the lever body while putting the fulcrum pin 30 between the claw pieces 36. Both the claw pieces 36 are engaged with one pair of fitting holes 37 of the rotator frame 10 shown in FIG. 5. Thus, this prevents the turn lever 29 from being detached from the rotator frame 10.

Figure 12:
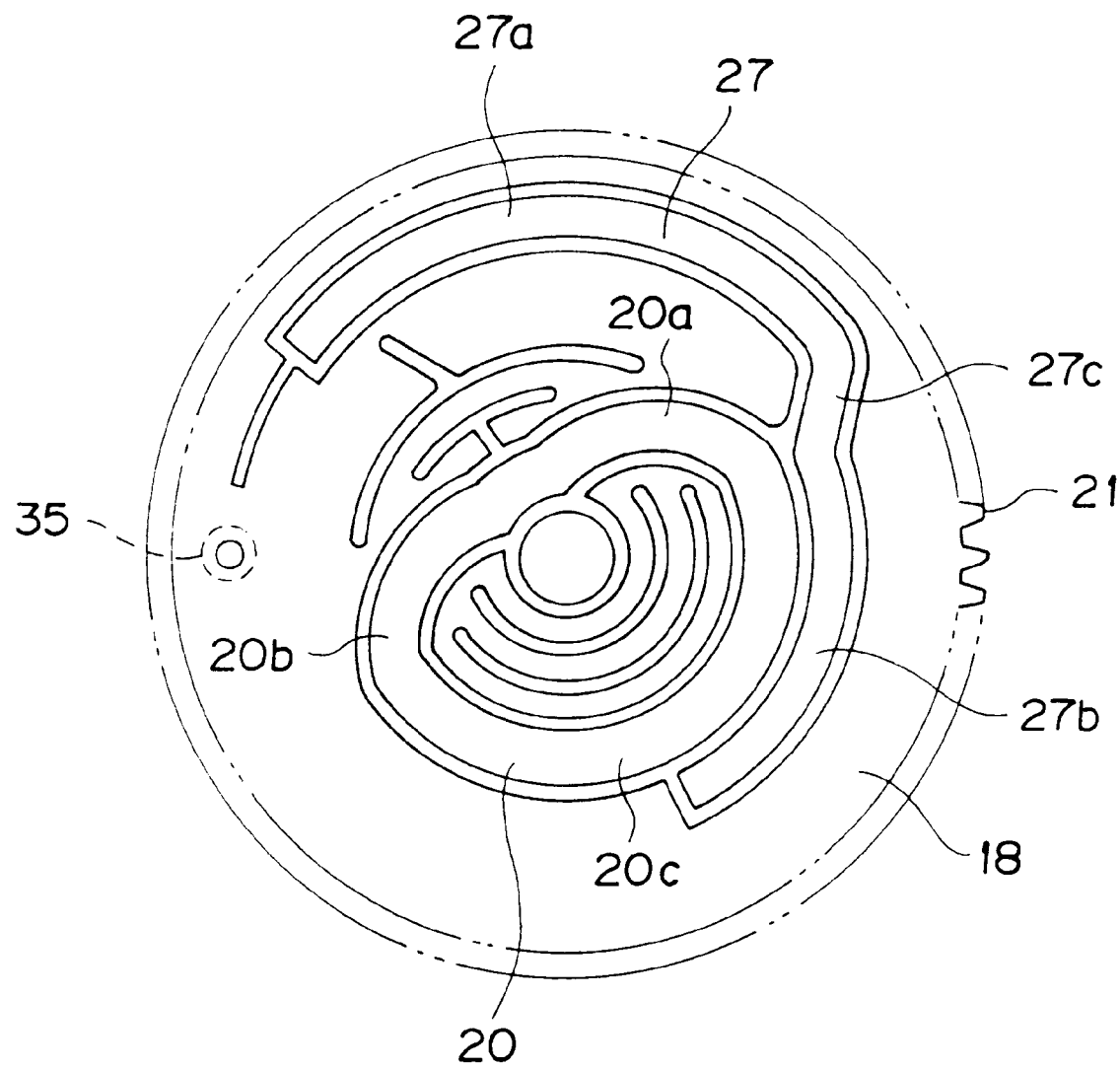
FIG. 12 is a front view of a groove cam of the embodiment.

As shown in FIG. 12, the second cam groove 27 is constituted by a combination of an inner arch portion 27b with the first spindle 11 as a central point, an outer arch portion 27a with the firstspindle 11 as the central point similarly to the inner arch portion 27b and an inclination portion 27c linking between the arch portions 27a and 27b.

As shown in FIG. 10, the third cam groove 28 is constituted by a combination of an upper arch portion 28a with the second spindle 12 as a central point, a lower arch portion 28b with the second spindle 12 as the central point similarly to the upper arch portion 28a and an intermediate arch portion 28c with a lower end of the guide groove 15 linking between the arch portions 28a, 28b as a central point.

The first cam groove 20, the second cam groove 27 and the third cam groove 28 are related to each other. One curved portion 20a, the arch portion 20c and the other curved portion 20b of the first cam groove 20 corresponds to the outer arch portion 27a, the inclination portion 27c and the inner arch portion 27b of the second cam groove 27 respectively, as well as the upper arch portion 28a, the intermediate arch portion 28c and the lower arch portion 28b of the third cam groove 28 respectively.

Accordingly, the motor 19 is driven in the state shown in FIG. 15, and the groove cam 18 starts to be clockwise rotated at the constant angle speed. While the swinger frame 13 is rotated from the top dead center thereof to the bottom dead center as mentioned above (FIGS. 15, 16 and 17), the outer arch portion 27a of the second cam groove 27 is linked to the upper arch portion 28a of the third cam groove 28 through the fitting pin 31. As a result, the rotator frame 10 with the swinger frame 13 is inclined downward in a substantially static state for the swinger frame 13. In the state in FIG. 15. the two retracting paths 8 and 9 face on the two moving paths 6 and 7, respectively, so that the optical pickups 4 and 5 can be freely moved between the moving paths 6 and 7 and the retracting paths 8 and 9, respectively. The swinger frame 13 is transiently stopped at the bottom dead center thereof as mentioned above (FIGS. 18, 19 and 20). For that period, the inclination portion 27c of the second cam groove 27 is linked to the intermediate arch portion 28c of the third cam groove 28 through the fitting pin 31. As a result, the rotator frame 10 is rotated by 180 degrees around the first spindle 11, and then stopped. When the groove cam 18 is further rotated, the swinger frame 13 is swung up ward as mentioned above (FIGS. 21, 22, 23, 24 and 25). At that time, the inner arch portion 27b of the second cam groove 27 is linked to the lower arch portion 28b of the third cam groove 28 through the fitting pin 31. As a result, the rotator frame 10 with the swinger frame 13 is returned upward in a substantially static state with respect to the swinger frame 13. In the state in FIG. 25, the two retracting paths 8 and 9 are switched with respect to the two moving paths 6 and 7. Then, the optical pickups 4 and 5, which are different from the previous case, are moved on the respective moving paths 6 and 7.

Although the groove cam 18 is rotated by 360 degrees in the states from FIG. 15 to FIG. 25, at that time a protrusion 35 on the groove cam 18 as shown in FIG. 12 pushes the switching lever 26a of the switch 26 downward. This causes the motor 19 to be reversely rotated when it is driven at a next time. That is, the switch is switched at the same time when it becomes the state in FIG. 25. In a case of switching the running paths of the optical pickups 4 and 5, the motor 19 is reversely rotated, and thereby the retracting paths 8 and 9 are returned from the state in FIG. 25 to that in FIG. 15. A pin, which is a stopper 38 of the rotator frame 10, is fixed on the fixture panel 14 as shown in FIG. 10, and notches 39 fitted to the stopper 38 are formed on the rotator frame 10 as shown in 5, such that the rotator frame 10 can be kept in the state in FIG. 15 or that in FIG. 25.

In this disk reproducing apparatus, preferably, in the two optical pickups 4 and 5, the first and second retracting paths 8 and 9 are respectively set as home positions, and after both the optical pickups 4 and 5 are returned to these home positions, the swinging mechanism and the rotating mechanism are driven. That is, when the swinging mechanism and the rotating mechanism are operated as mentioned above, the two optical pickups 4 and 5 are retracted in advance on the first and second retracting paths 8 and 9. As a result, it is possible to protect the flexible cables of the optical pickups 4 and 5 from being twisted or distorted.

The operation of the disk reproducing apparatus is explained.

For example, in a case of reproducing a CD as the disk d1, the disk tray 2 in the state shown in FIGS. 1 and 2 is pull forward by the operation of the driving mechanism (not shown). After the CD (d1) is mounted on the disk tray 2, it is returned to the original position. Next, the motor base 40 is lifted up by the drive of the ascending and descending mechanism (not shown). The turn table 3 on the motor base 40 holds the CD (d1) and rotates the CD (d1) at a constant speed. The driving mechanism (not shown) causes the optical pickup 4 to run along the lower moving path 6 in the radial direction of the CD. This enables the record information of the CD (d1) to be reproduced. When the reproduction is ended, the optical pickup 4 is retracted from the moving path 6 onto the retracting path 8 by control of a controlling device (not shown) of the disk reproducing apparatus.

In a case of reproducing an LD as the disk d2 instead of the CD (d1), the LD (d2) is placed into the disk reproducing apparatus by pulling out the disk tray 2 and replacing the CD (d1) with the LD (d2). Then, the motor 19 is driven. The swinger frame 13 is lowered downward. The rotator frame 10 is rotated. Phases of the retracting paths 8 and 9 are changed by 180 degrees. Accordingly, the places are switched. And, when the swinger frame 13 is returned upward, the retracting paths 8 and 9 are linked to the moving paths 6 and 7 in the state switched from the previous combination. This causes the optical pickup 5 for the LD to move on the lower moving path 6 and scan the LD (d2). In a case of ending the reproduction on a front surface of the LD (d2) and then reproducing a rear surface thereof, the switching action between the retracting paths 8 and 9 and the moving paths 6 and 7 are carried out similarly to the above mentioned case. This causes the optical pickup 5 for the LD to move on the upper moving path 7 and scan the rear surface of the LD (d2).

Although the pickup 4 is used at a time of reproducing the DVD, in this case, the scanning action of the DVD is also carried out similarly to the above mentioned case.

Figure 26A:
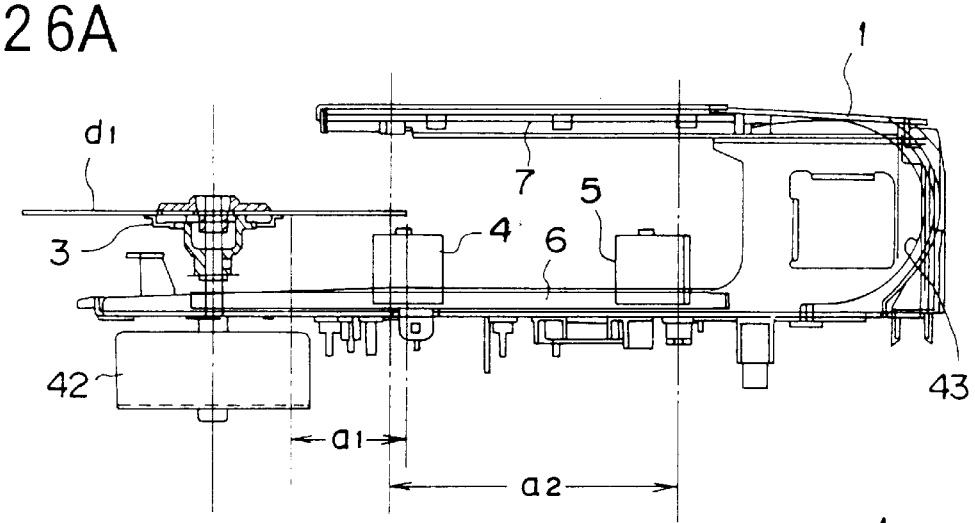
FIG. 26A, 26B, and 26C are side views showing another embodiment of a disk reproducing apparatus.
Figure 26B:
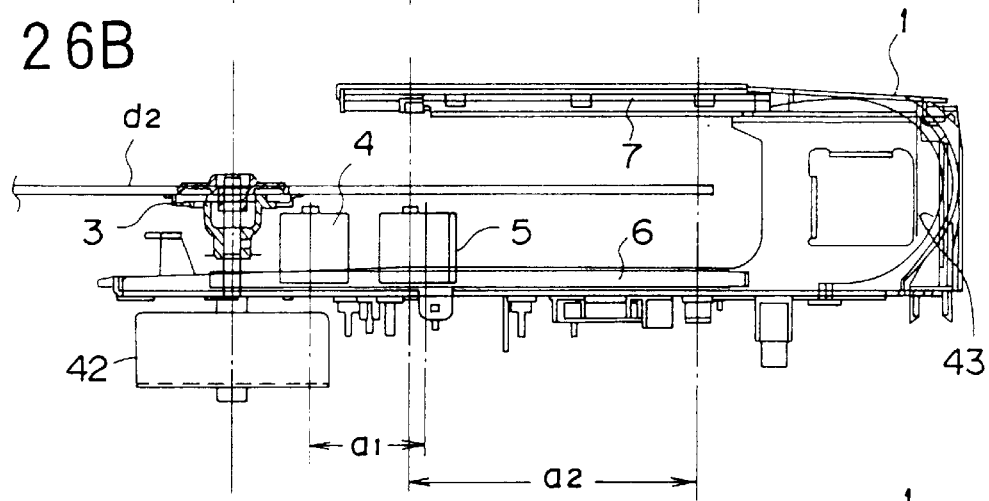

In the present invention, as shown in FIGS. 26A and 26B, it is possible to implement such a configuration that two optical pickups 4 and 5 share one moving path 6 at the same time. That is, the moving path 6 shared by the two types of the optical pickups 4 and 5 is arranged on a record surface of a disk, substantially parallel to each other. The optical pickup 4 for scanning the disk d1, on which a record surface extends to an inner circumference side, is disposed at the side near to the disk center on the moving path 6, and the other optical pickup 5 is disposed on the opposite side (i.e. far from the disk center). So, the configuration described below is desired. That is, when one optical pickup 4 for scanning the disk d1 in which the record surface extends to the inner circumference side reproduces the disk d1, the other optical pickup 5 is waited at a place which is separated from the record surface of the disk d1 under the reproduction to the outer circumference side. When the other optical pickup 5 reproduces the disk d2 whose type is different from that of the disk d1, one optical pickup 4 is waited at a place which is separated from the record surface of the disk d2 under the reproduction to the inner circumference side.

Accordingly, as shown in FIG. 26A, in a case of reproducing a CD or a DVD (d1), the optical pickup 4 is moved on the moving path 6, and reciprocated within a stroke a1 corresponding to a record area of the CD or the DVD (d1). In this case, in order not to obstruct this movement of the optical pickup 4, the other optical pickup 5 is escaped and stopped at a place separated from the record area of the CD or the DVD (d1). Further, as shown in FIG. 26B, in a case of reproducing an LD (d2), the other optical pickup 5 is moved on the moving path 6 and reciprocated within a stroke a2 corresponding to a record area of the LD (d2). In this case, one optical pickup 4 is escaped and stopped at a place separated from the record area of the LD (d2), in order not to obstruct the movement of the other optical pickup 5.

Figure 26C:
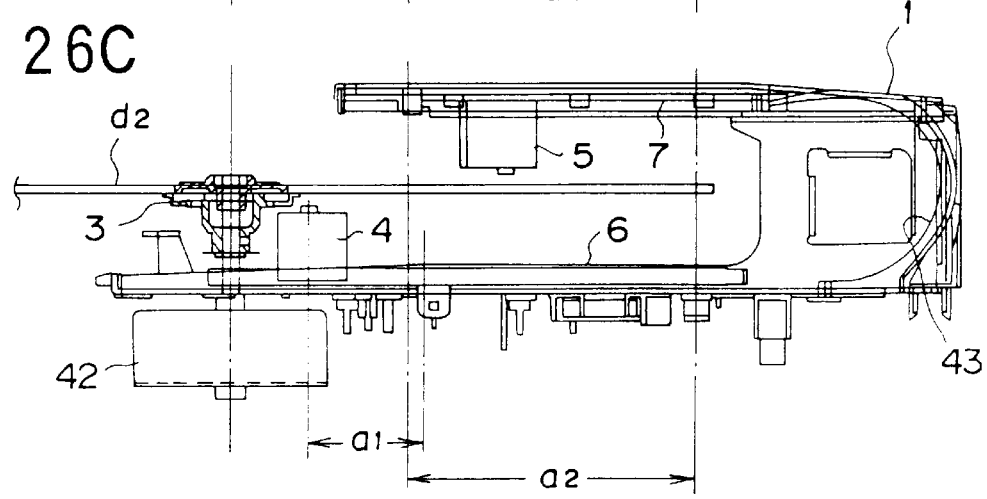

Generally, the LD (d2) has the record areas on both surfaces thereof. Then, in order to reproduce a rear surface without turning over the LD (d2) after one surface is reproduced by the optical pickup 5, as shown in FIG. 26C, it is allowable that the moving paths 6 and 7 parallel to each other are arranged so as to put the disk surface between them and the moving path 6 is linked to the moving path 7 through a U turn rail 43, Thanks to the above mentioned configuration, in a case of ending the reproduction of one surface of the disk and then reproducing the other surface, it is enough that the optical pickup 5 is transferred from the moving path 6 through the U turn rail 43 to the moving path 7 and reciprocated within the stroke a2 corresponding to the record area of the LD, on the moving path 7. Since the mechanism of transferring the optical pickup 5 on the moving paths 6 and 7 and the U turn rail 43 is well known, detailed explanations thereof are omitted.

Although the reproducing operation of the optical disk is explained in the above mentioned embodiments, it is natural that the present invention can be similarly applied to the recording operation of the optical disk.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup apparatus for an optical disk recording and/or reproducing apparatus, which records and/or reproduces information on an information record surface of an optical disk loaded thereto, said optical pickup apparatus comprising:

at least two types of optical pickups for at least two types of optical disks respectively;

first and second guiding rails arranged substantially parallel to each other such that the information record surface of said loaded optical disk is disposed between said first and second guiding rails, for respectively guiding said optical pickups along the information record surface of said loaded optical disk in a radial direction of said loaded optical disk;

first and second retracting rails respectively alignable with said first and second guiding rails, for independently retracting thereonto said optical pickups from said first and second guiding rails through linkages with said first and second guiding rails respectively;

a rotator frame for holding said first and second retracting rails; and a rotating mechanism for rotating said rotator frame around an axis parallel to said first and second retracting rails and for swapping said first and second retracting rails to each other.

2. An optical pickup apparatus according to claim 1, wherein both of said optical pickups are commonly guided by at least one of said first and second guiding rails.

3. An optical pickup apparatus according to claim 1, wherein said rotating mechanism rotates said rotator frame after said optical pickups are retracted from said guiding rails to said first and second retracting rails as home positions for said optical pickups.

4. An optical pickup apparatus according to claim 1, wherein said first and second retracting rails are arranged such that said optical pickups respectively on said first and second retracting rails are opposed to each other with said axis as a center point.

5. An optical pickup apparatus according to claim 1, wherein one of said optical pickups is guided by one of said first and second guiding rails to move along the information record surface of said loaded optical disk so as to record and/or reproduce the information while the other of said optical pickups is guided to be positioned away from the loaded optical disk in standby.

* * * * *